United States Patent [19]

Coblenz

[11] Patent Number: 4,772,524

[45] Date of Patent: Sep. 20, 1988

[54] FIBROUS MONOLITHIC CERAMIC AND METHOD FOR PRODUCTION

[75] Inventor: William S. Coblenz, Hudson, Mass.

[73] Assignee: The United States of America as represented by the Secretary of Commerce, Washington, D.C.

[21] Appl. No.: 851,607

[22] Filed: Apr. 14, 1986

[51] Int. Cl.⁴ .................. B32B 9/00; B32B 17/00; D02G 3/00

[52] U.S. Cl. .................... 428/699; 428/375; 428/379; 428/384; 428/389; 428/689

[58] Field of Search ............. 428/379, 384, 389, 373, 428/698, 699, 375, 689; 523/209

[56] References Cited

U.S. PATENT DOCUMENTS

| | | | |
|---|---|---|---|
| 2,699,415 | 1/1955 | Nachtman | 428/384 X |
| 3,098,723 | 7/1963 | Micks | 428/389 |
| 3,793,041 | 2/1974 | Sowman | 106/57 |
| 3,795,524 | 3/1974 | Sowman | 106/65 |
| 3,811,920 | 5/1974 | Galasso et al. | 428/389 X |
| 3,953,636 | 4/1976 | Kirchner | 428/699 X |
| 3,996,145 | 12/1976 | Hepburn | 428/384 X |
| 4,605,594 | 8/1986 | Owens et al. | 428/373 |
| 4,640,848 | 2/1987 | Cerdan-Diaz et al. | 523/209 X |
| 4,642,271 | 2/1987 | Rice | 428/698 |

FOREIGN PATENT DOCUMENTS 1397955  6/1975  United Kingdom ............... 428/384

Primary Examiner—Lorraine T. Kendell
Attorney, Agent, or Firm—Thomas Zack; Alvin Englert; Thomas P. Pavelko

[57] ABSTRACT

The present invention is a fibrous monolithic ceramic product of high density and a process for making the product. The product has a microstructure of coated fibers with planes of weakness between a core of each coated fiber and its respective coat or between each coated fiber and adjacent coated fibers, thereby toughening the product. The planes of weakness are sufficiently weak to deflect a crack from normal to the plane of weakness to a direction parallel to the plane of weakness. The green body from which the product is formed, can be plastically deformed at room temperature, formed in near-net-shape, and densified by pressureless sintering.

13 Claims, 6 Drawing Sheets

FIBROUS MONOLITHIC CERAMIC AND METHOD FOR PRODUCTION

BACKGROUND OF THE INVENTION

1. Field of the Invention

This invention relates to refractory materials for use in high temperature structural applications and a method for making these materials. More particularly, this invention relates to fibrous ceramic materials which can be formed into complex shapes in the green state and can be densified by pressureless sintering.

2. Discussion of the Prior Art

It is generally agreed that high fracture toughness is needed for ceramic materials used in high temperature structural applications in heat engines, as well as non-heat engine applications. Two aspects relating to the use of ceramics in high temperature structural applications are as follows:

(1) material performance; and
(2) shape-forming capability. High strength, fracture toughness and reliability (as measured by a Wiebul modulus) are desirable material properties for high performance applications. Ceramic fiber-ceramic matrix composites are currently of interest because of their desirable mechanical properties. Most of the work in this field, prior to 1983, is reviewed by D. C. Phillips, "Fibre Reinforced Ceramics," published in Handbook of Composites, Vol. 4, *Fabrication of Composites*, edited by A. Kelley and S. T. Mileiko, Elsevier Science Publishers, 373–428 (1983). Materials with good mechanical properties have been fabricated by hot-pressing chopped or continuous fibers mixed with a glass frit or metal oxide powder. The hot-pressing allows the glass frit or metal oxide powder to flow during densification thus producing a dense matrix surrounding the fibers. However, these mixtures cannot be pressurelessly sintered to high density because the fibers resist the shrinkage of the matrix powders leaving large voids between the fibers. The hot pressing process is limited in both the size and the shape of components which can be formed. The ability to form near-net-shapes is important for ceramic materials because machining is time-consuming and expensive. The machining process may also introduce strength limiting surface flaws.

SUMMARY OF THE INVENTION

It is an object of this invention to provide a fibrous ceramic material and method for its production, wherein the ceramic material comprises a plurality of coated fibers.

Another object of this invention is to provide a fibrous ceramic material and method for its production, wherein the material can be formed into complex shapes in the green state and can be densified by pressureless sintering.

This invention combines the high performance capabilities of ceramic fiber-ceramic matrix composites with the shape forming capability of monolithic polycrystalline ceramics. In this context, the term "monolithic polycrystalline ceramic," refers to those ceramic materials which are prepared from powder. The article of the present invention is shaped from coated fibers, comprising a core fiber and a coating, in the green state by various methods including die pressing, or injection molding with fugitive vehicles; the shaped body is next heat treated at a temperature sufficient to result in sintering wherein the body shrinks, typically between about 10 and about 20%, to produce a dense body of "near-net-shape." High densification is possible because both green core fiber and green coating can shrink together.

The sintered product has a microstructure of coated fibers with planes of weakness between the core of each coated fiber and its respective coating or between each coated fiber and its adjacent fibers. The planes of weakness are sufficiently weaker than the fiber core to deflect a crack from normal to the plane of weakness to a direction parallel to the plane of weakness. The separation by debonding and pullout of fibers along the planes of weakness reduces crack tip stress intensity and prevents further propagation of cracking. The deflection occurs because the strength of the fiber core is high relative to the strength of the planes of weakness along the interface between the fibers or between each fiber and its respective coating so a crack preferentially follows the planes of weakness rather than continue through the core. The coating may be any material that is thermodynamically stable relative to the core. The material must be thermodynamically stable or sufficiently slow to react such that the coating does not form a solid solution wth the core and become absorbed by the core and thus disappear.

BRIEF DESCRIPTION OF THE DRAWINGS

The present invention may be better understood by reference to the following drawings, wherein.

DETAILED DESCRIPTION OF THE PREFERRED EMBODIMENTS

The microstructure of the product of this invention is modeled after the jade mineral nephrite. There have been two published studies of the strength, fracture surface energy and fracture toughness of jade. See D. J. Rowcliffe V. Fruhauf, "The Fracture of Jade,", *J. Mater. Sci.*, Vol. 12, 35–42 (1977) and R. C. Bradt, R. W. Newnhamn, and J. W. Braggers, "The Toughness of Jade," *Am. Mineralogist*, Vol. 58, 727–32 (1973). Nephrite has a fibrous microstructure with planes of weakness between fibers so that during fracture, fibers debond and pull out resulting in a high fracture energy. The processing challenge of the present invention is to produce a fibrous microstructure with planes of weakness like those of natural jade or jade-type materials.

Figure 1:
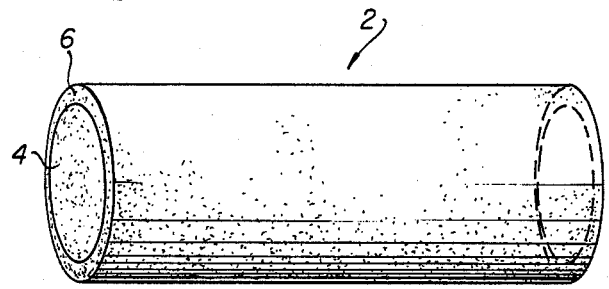
FIG. 1 is a schematic diagram of a single coated fiber of the present invention.
Figure 4:
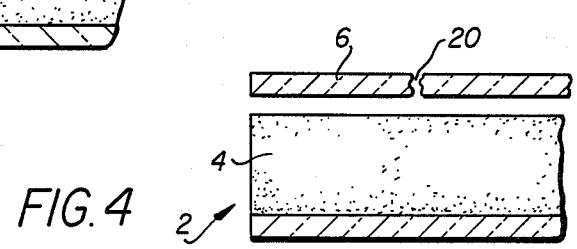
FIG. 4 is a schematic diagram of the coated fiber of FIG. 1 after a crack has debonded a portion of a coating from the core of the fiber.
Figure 5:
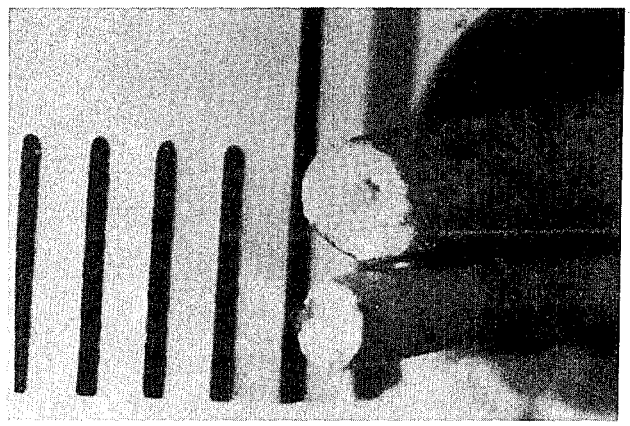
FIG. 5 is an optical photograph of green alumina fibers with a thin titanium oxide coating (dark portion), one division equals one millimeter.

FIG. 1 shows a coated fiber 2 comprising a green core fiber 4 of a primary phase formed from polymer loaded slurries of submicron sinterable powder. The green fiber 4 has a coat 6 with a thin second phase formed from a second polymer loaded slurry. The coat 6 is termed a debonding coat because a stress will debond the coat 6 from a neighboring coated fiber 5 (as in FIG. 2) or core fiber 4 (as in FIG. 4). FIG. 5 shows a photograph of two coated fibers of the present invention. The coated fibers of FIG. 5 comprise green alumina fibers (the light colored core) with a thin titanium oxide ($TiO_2$) coat (the dark colored coat). Also a cotton thread is visible in the center of the core of the fibers. On FIG. 5, 1 division equals 1 millimeter.

The choice of coat composition is made such that the phases formed on sintering in core fibers and coats are chemically compatible, that is, they will not react to the extent that the fibers will be damaged. The coat should also produce planes of weakness between the fibers or between the coat and its respective core fiber. The planes of weakness can arise because the bonding phase of the coat itself is weak relative to the fibers; or due to a thermal expansion mismatch between phases; or due to large differences in elastic moduli; or due to a phase transformation in the debonding coat with an associated volume change typically resulting in microcracking.

The ceramic product is produced from the coated fibers as follows. The green fibers are plastically deformable at room temperature, so the green fibers are shaped in the green state by various methods including die pressing in a metal mold, or injection molding with fugitive vehicles to form near-net-shape green bodies. The body next undergoes slow heating at temperatures of at least about 300° C. (about 570° F.). The body is then heat treated by pressureless sintering. During sintering the shaped body is typically heat treated at a temperature of at least 500° C. (about 932° F.), and the body typically shrinks between about 10 and about 20%, to produce a dense body of near-net-shape.

Figure 2:
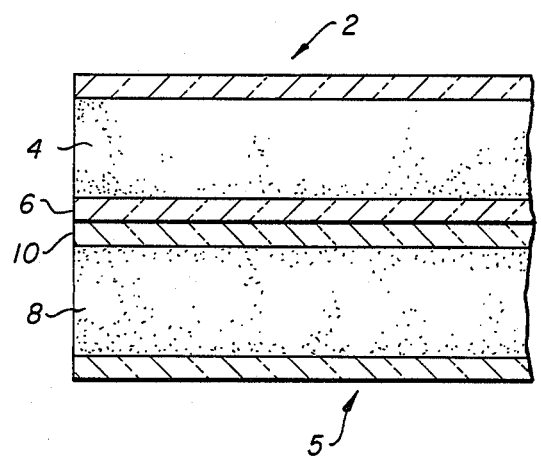
FIG. 2 is a schematic diagram of two coated fibers prior to debonding.
Figure 3:
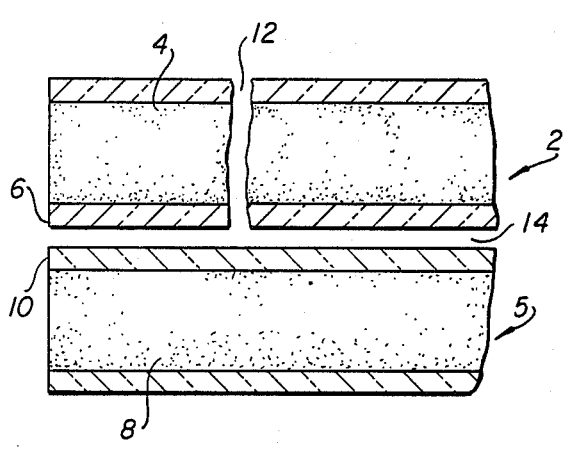
FIG. 3 shows the two coated fibers of FIG. 2 after a crack has debonded one fiber from another.

An advantage of the fibrous monolithic ceramic body of the present invention is that it has a microstructure of coated fibers with planes of weakness between the core of each coated fiber and its respective coat or between each coated fiber and its adjacent fibers. High densification is possible between both green fibers and green coating can shrink together to produce fibrous monolithic structures of high density. Also, these planes of weakness are sufficiently weak to deflect a crack from normal to the plane of weakness to a direction parallel the plane of weakness. This is shown by FIGS. 2-4. FIG. 2 shows a schematic diagram of two coated fibers 2, 5 attached to one another prior to stress from a crack. The coated fiber 2 has the central core 4 and debonding coat 6. The coated fiber 5 has a central core 8 and debonding coat 10. FIG. 3 schematically shows that, when a plane of weakness lies between coated fibers 2 and 5, a crack 12 separates the fibers 2, 5 to form an opening 14, thus deflecting the crack 12. FIG. 4 schematically shows that when the plane of weakness lies between the debonding coat 6 and central core 4, a crack 20 is deflected by separating the debonding coat 6 from the central core 4. A fibrous monolithic ceramic body comprising the plurality of sintered coated fibers with the planes of weakness would be tougher than a fibrous monolithic ceramic body of uncoated fibers because the planes of weakness absorb crack tip stress when they separate to deflect the crack.

The following examples illustrate the preparation of a fibrous monolithic ceramic body comprising coated fibers having a central core of alumina and a debonding coat of titanium oxide.

EXAMPLES

An alumina ($Al_2O_3$) slurry was prepared by combining the components of Table 1.

TABLE 1

| | | |
|---|---|---|
| $Al_2O_3$ powder[a] | 492 | gms |
| Polyvinyl Alcohol[b] (PVA) | 25 | gms |
| Glycerin[c] | 5 | gms |
| Polyethylene Glycol (PEG 400)[d] | 1.0 | gm |
| Triton X-100[e] | 0.1 | gm |
| $Mg(NO_3)_2.6H_2O$[f] | 3.18 | gm |
| Distilled Water | 1000 | cc |

[a]Linde A, Union Carbide
[b]"Elvanol," E. I. DuPont DeNemours & Co., Inc.
[c]Fisher Scientific
[d]Carbowax PEG400, Fisher Scientific Co.
[e]Triton X-100, (Alkyl phenoxy polyethoxy ethanol), Rohm and Haas Co.
[f]J. T. Baker Chemical Co.

All ingredients, except the alumina powder, were added to cold water and heated slowly to 85° C. (185° F.) and held at this temperature while stirring until the polyvinyl alcohol had dissolved (about 2 hours). The alumina powder was added while stirring to form a slurry. Up to about 1 cubic centimeter (cc) of concentrated nitric acid was added to defloculate the slurry.

The slurry was then ball milled for about 16 hours in a plastic container with alumina media. About 1 cubic centimeter of green food coloring from McCormic and Company, Inc. was added to color code the base fiber. The alumina slurry was next heated while stirring to drive off water and produce a high viscosity paste with a paint-like consistency. Weight loss on drying at 100° C. (212° F.) of this paste was 48.35 wt %. This weight loss estimates the water content of the slurry. The dried paste had a weight loss of 8.37 wt % on heating to 500° C. (932° F.). This weight loss estimates the binder and plasticizer content of the green fibers.

Green fibers having about a 1 millimeter diameter were formed by pulling a thread of mercerized cotton, (thread size 50, white, and made by the Singer Company) through the alumina paste and hanging the wet fibers to air dry at room temperature.

A $TiO_2$ coating slurry was prepared by combining the compounds listed on Table 2.

TABLE 2

| | | |
|---|---|---|
| Polyvinyl Butyral[h] | 2 | gm |
| Polyethylene Glycol[i] | 2 | gm |
| $Ti(OC_4H_9)_4$[j] | 10 | gm |
| Isopropanol | 100 | cc |

[j]Titanium (IV) butoxide, Alfa Products
[i]Carbowax PEG400, Fisher Scientific Co.
[h]"Butvar," B-98, Monsanto The above ingredients were combined and approximately 10 cubic centimeters of water were added to hydrolyze the titanium alkoxide and form a titanium oxide ($TiO_2$) slurry. Red food coloring produced by McCormick & Co., Inc. was added to color code the coating layer. The titanium oxide slurry was coated on the fibers by dripping the slurry on the tops of the hanging fibers. The fibers were coated as the slurry drips down the fibers. The color coding is useful for determining when the fibers are coated because without the coloring both slurries would be white. The alcohol based solvent was chosen to minimize dissolution of the binder from the core fiber.

Coated fibers, still in the green state, were cut to length (1¾ inches) and loaded into a steel bar die with a cross-section of 1¾ inches by 5/16 inches. The fibers are aligned uniaxially for this example but could be arranged in cross-plies or could be woven or chopped to improve off-axis properties if desired. A die pressing pressure of about 20,000 pounds per square inch (20 kpsi) was used to compact the bars. At this stage of the processing, the bars are slowly heated to 500° F. (932° C.) to burn out both binders and cotton threads. The bars were then isopressed in rubber bags at approximately 50 kpsi to close large voids which may have been left by burnout of the binder and more importantly, the cotton threads. The bars were next pressurelessly sintered at about 1500° C. (2700° F.) for about 16 hours and this resulted in a linear shrinkage of about 18%.

Crystalline phases present in sintered samples were alpha alumina (major) and aluminum titanate, $Al_2TiO_5$ (minor) as determined by X-ray powder diffraction analysis (Cu K$\alpha$ radiation). The titanium oxide reacts with alumina to form aluminum titanate during sintering. Table 3 lists bend strength measurements for a number of the sintered samples prepared by the above method.

TABLE 3

| Sample | Designation |
| --- | --- |
| A. | 3-point bend (20 mm span) width = 0.252" thickness = 0.117" bend strength = 101 MPa rough fracture surface with fiber debonding and pullout |
| B. | 3-point bend (20 mm span) cross-head speed = 0.10"/min. width = 0.262" thickness = 0.135 inches bend strength = 143.5 MPa rough fracture surface without fiber pullout |
| C. | 4-point bend top span = 7 mm, bottom span = 31 mm width = 0.257 thickness = 0.154" bend strength = 54 MPa rough fracture with fiber debonding and pullout |
| D. | 4-point bend top span = 7 mm, bottom span = 31 mm width = 0.253" thickness = 0.112 cross-head speed = 1.0 mm/min. bend strength = 139 MPa rough fracture without fiber pullout |
| E. | 4-point bend top span = 7 mm, bottom span = 31 mm width = 0.255" thickness = 0.133" cross-head speed = 1 mm/min. bend strength = 133.6 MPa rough fracture surface without fiber pullout |
| F. | 4-point bend top span = 7 mm, bottom span = 31 mm width = 0.257" thickness = 0.151" cross-head speed = 0.010 mm/min. bend strength = 136 MPa rough fracture surface a small |

TABLE 3-continued

| Sample | Designation |
| --- | --- |
| | amount of fiber pullout evident |

Bulk densities and open porosity were measured on selected samples using the immersion method in water. Samples D, E and F had a bulk density of 3.716 grams/cubic centimeter. Sample A had a bulk density of 3.738 grams/cubic centimeter with values of open porosity of 3.6% for Samples D, E and F and 4.4% for Sample A. The percentage of theoretical density of the samples depends on the volume fraction of phases present, which was not measured directly on these samples. The theoretical density of alpha-alumina ($Al_2O_3$) is 3.987 grams per cc and that of aluminum titanate ($Al_2TiO_5$) is 3.702 grams per cc. The value of theoretical density for alpha-alumina and aluminum titanate is taken from the Joint Committee on Powder Diffraction Standards, National Bureau of Standards, Card Nos. 10–173 and 6–40, respectively. The theoretical density for the two phase mixture (if fully dense) would be given by the following equation:

$$\rho_{mixture} = \rho_{Al_2TiO_5} \times (1 - X_{v,Al_2TiO_5}) + \rho_{Al_2TiO_5} \times (X_{v,Al_2TiO_5})$$

where: $X_{v,Al_2TiO_5}$ = Volume fraction $Al_2TiO_5$

For volume fractions of aluminum titanate ranging from 0 to 5%, the bulk density would range from 3.987 grams per cc to 3.973 grams per cc. The samples prepared in this example have approximately 94% of their theoretical density. In the present invention, the sintered product should be greater than about 90% of its theoretical density, preferably greater than about 92% of its theoretical density. Aluminum titanate was chosen because it has low shear strength, thus the planes of weakness occur because the debonding coat itself is weak.

Bend strength, also known as flexural strength, ($\sigma$, MPa) were measured by 3-point or 4-point bending of selected samples listed on Table 3. 4-point bending is described in more detail in the Journal article to D. J. Rowcliffe, V. Fruhauf, "The Fracture of Jade", *J. Mater. Sci.*, Vol. 12, 35–42 (1977), which is herein incorporated by reference. 3-point bending is similar to 4-point bending. No fracture toughness measurements were made. However, the load-deflection curve on samples with fiber-pullout exhibited roll-over before the maximum stress was reached and exhibited a significant load carrying capability (about 20% of maximum load) after failure.

Figure 6:
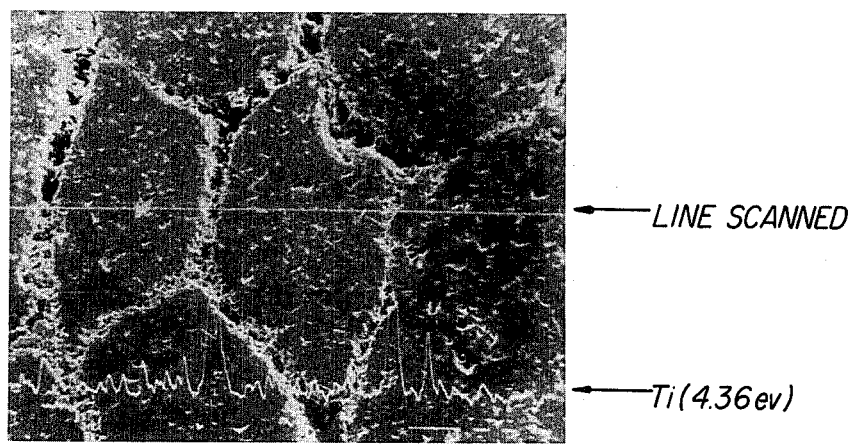
FIG. 6 is an scanning electron photomicrograph (100X) with an X-ray line scan for titanium (4.36 ev)

The green fibers, shown in FIG. 5, are typical of those used to make ceramic composites of the present invention. The dark surface coating is the titanium oxide coating. The cotton thread is evident in the center of each fiber. The green fibers are deformed during compaction as is evident from the polished section, shown in FIG. 6, normal to the long axis of the fibers. The inter-fiber debond phase of aluminum titanate has pulled out during polishing due to its weak nature. Pullout which occurs during polishing is when grains or fibers are pulled out of a matrix. The pullout from polishing is shown by the dark regions between the fibers shown by FIG. 6. The titanium-X-ray line scan (4.36 ev) confirms that the titanium is localized as a coating about 30 microns thick at the inter-fiber boundaries.

Pullout which occurs during polishing differs from "fiber pullout" which occurs during fracture. While it is not desired to be limited by theoretical considerations, it is believed that fiber pullout during fracture is a toughening mechanism because it deflects cracks.

Figure 7:
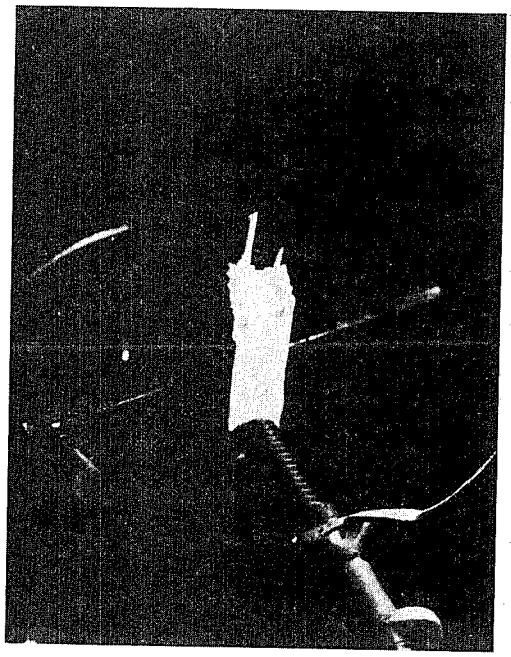
FIG. 7 is an optical macro-photomicrograph for a fracture surface.
Figure 8:
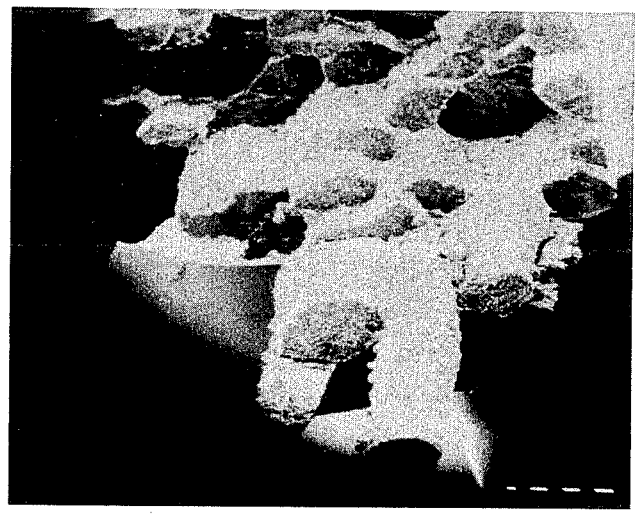
FIG. 8 is a scanning electron photomicrograph (20X) of a fracture surface.
Figure 9:
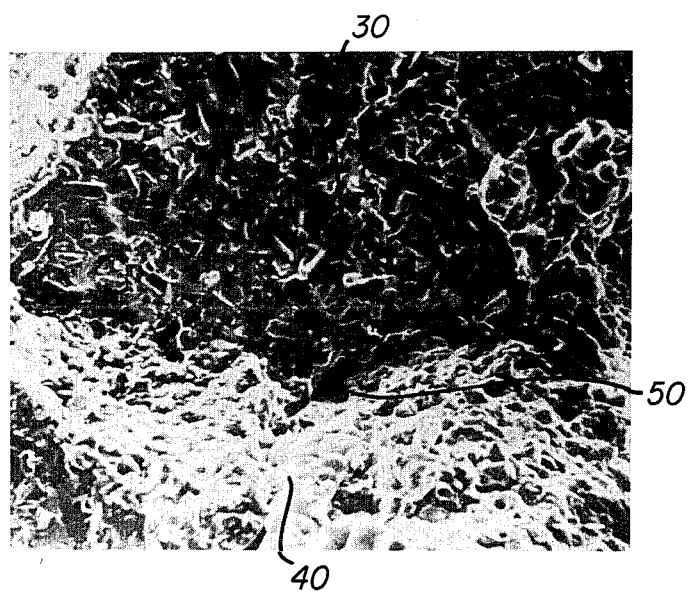
FIG. 9 is a scanning electron photomicrograph (200X) of the fracture surface of FIG. 8.

Rough fracture surfaces with fiber pullout were observed on some samples as described on Table 3 and shown by FIGS. 7-9. FIG. 7 shows an optical macrophotomicrograph of the surface from Sample C of Table 3. FIG. 7 clearly shows the fiber pullout. FIG. 8 shows a scanning electron micrograph (S.E.M.) photomicrograph (20X) of a fracture from Sample A of Table 3. FIG. 8 also shows the fiber pullout. FIG. 9 is a S.E.M. photomicrograph (200X) of a portion of FIG. 8. The top (darker area) of FIG. 9 shows the core 30 of a fiber and the bottom (lighter area) shows the coat 40 of a fiber. A crack 50 has formed between the core 30 and core 40 of FIG. 9. Thus, the plane of weakness is similar to that of FIG. 4 which has debonding at the interface of the core 4 and its respective coat 6.

This work demonstrates that fibrous materials may be shaped in the green state and pressurelessly sintered to high density. Interface control via addition of a debonding phase has also been demonstrated. Reduction in fiber diameter by a factor of ten relative to that of the samples (1 mm to 100 μm) should increase strength by reducing the flaw size. Ceramic fibers are commercially produced with diameters of 10 to 100 μm by spinning or extrusion.

The coated fibers of the present invention may include multiple coatings. For example, alumina fibers could be coated with a thin $Al_2TiO_5$ layer which is coated with a thicker alumina layer. The resulting structure would be an alumina fiber, alumina matrix composite with controlled interface debonding. Such a process would assure uniform fiber spacing. The range of compositions made by this process is almost limitless, so long as the coatings and cores are thermodynamically compatible. Table 4 provides examples.

TABLE 4

| Fiber-Debond Phase Combinations | |
|---|---|
| Fiber | Debond Phase |
| $Al_2O_3$ | $Al_2TiO_5$ |
| $Al_2O_3$ | $ZrO_2$ or $HfO_2$ |
| Mullite | $Al_2TiO_5$ |
| $Y_2O_3$ | $YCrO_3$ |
| SiC | TaC |
| $Si_3N_4$ | BN |

The invention should not be limited to ceramic powders as starting materials. Both oxide and non-oxide materials may be fabricated. Organometallic polymers such as polysilanes, polycarbosilanes, carboranes, silicones or polysilazanes may be used with or without powder fillers. The organometallic polymers have the advantage of yielding ceramic material on pyrolysis and may be used as the binder phase in the green state.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:
1. A fibrous, monolithic ceramic body consisting essentially of
a plurality of compacted coated fibers, each coated fiber comprising a core fiber coated by a first debonding coat, said core fibers comprised of a first ceramic composition and said first debonding coat comprising a second ceramic composition which is different from said first composition; said first and said second composition defining a plane of weakness comprising an interface between said first coat and said first coat's respective core fiber, wherein said interface is relatively weaker than said core fibers; and said coat and core are thermodynamically compatible.
2. The ceramic body of claim 1, wherein said interface is sufficiently weaker than said core fiber to deflect a crack from normal to the direction of said interface to a direction parallel to said interface.
3. The ceramic body of claim 2, wherein said body has a density of at least about 90% of its theoretical density.
4. The ceramic body of claim 2, wherein said body has a density of at least about 92% of its theoretical density.
5. The ceramic body of claim 3, wherein said first and second compositions are sintered ceramics.
6. The ceramic body of claim 3, wherein said first composition of said core fiber comprises alumina and said second composition of said first coat comprises a member selected from the group consisting of aluminum titanate, zirconia and hafnia.
7. The ceramic body of claim 5, wherein said first coat is thermodynamically stable with respect to its respective core fiber.
8. The ceramic body of claim 7, wherein a thermal expansion coefficient of said first coat differs from that of said core fiber, thereby forming said plane of weakness.
9. A fibrous, monolithic ceramic body consisting essentially of a plurality of compacted coated fibers, each coated fiber comprising a core fiber coated by a first coat, said core fibers comprised of a first ceramic composition and said first coat comprising a second ceramic composition which is different from said first composition; said first and said second composition reacting to form a bonding phase, said bonding phase located at an interface between said core fiber and first coat and said bonding phase is weak relative to said core fiber, thereby forming said plane of weakness, said coat and core being thermodynamically compatible.
10. The ceramic body of claim 7, wherein an elastic modulus of said first coat differs from that of said core fiber, thereby forming said plane of weakness.
11. The ceramic body of claim 7, wherein said core fiber has an outside diameter between about 100 microns and about 1000 microns.
12. The ceramic body of claim 7, wherein said coated fiber further comprises a second coat which overlays said first coat, said second coat having a third composition which differs from that of said first coat.
13. The ceramic body of claim 12, wherein said third composition is selected from the group consisting of sintered ceramics and sintered organometallic polymers.

* * * * *